United States Patent
Liang et al.

(10) Patent No.: US 10,243,437 B2
(45) Date of Patent: Mar. 26, 2019

(54) PERMANENT MAGNET ROTOR AND PERMANENT MAGNET ROTARY ASSEMBLY

(71) Applicant: INDUSTRIAL TECHNOLOGY RESEARCH INSTITUTE, Hsinchu (TW)

(72) Inventors: Kun-Yi Liang, Hsinchu County (TW); Tse-Liang Hsiao, Hsinchu (TW); Chien-Chang Wang, Hsinchu County (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 248 days.

(21) Appl. No.: 15/377,925

(22) Filed: Dec. 13, 2016

(65) Prior Publication Data
US 2018/0123436 A1  May 3, 2018

(30) Foreign Application Priority Data
Oct. 28, 2016  (TW) .............................. 105135177 A

(51) Int. Cl.
*H02K 21/16* (2006.01)
*H02K 1/14* (2006.01)
*H02K 1/27* (2006.01)

(52) U.S. Cl.
CPC .............. *H02K 21/16* (2013.01); *H02K 1/146* (2013.01); *H02K 1/2706* (2013.01); *H02K 1/278* (2013.01)

(58) Field of Classification Search
CPC ...... H02K 21/16; H02K 1/146; H02K 1/2706; H02K 1/278
See application file for complete search history.

(56) References Cited

U.S. PATENT DOCUMENTS

| 4,954,736 | A |   | 9/1990 | Kawamoto et al. |
| 5,783,893 | A | * | 7/1998 | Dade ...................... H02K 16/00 310/114 |

(Continued)

FOREIGN PATENT DOCUMENTS

| CN | 201219227 Y | 4/2009 |
| CN | 205377498 U | 7/2016 |

(Continued)

OTHER PUBLICATIONS

TW Office Action dated Apr. 25, 2017 as received in Application No. 105135177.

(Continued)

*Primary Examiner* — Emily P Pham
(74) *Attorney, Agent, or Firm* — Maschoff Brennan

(57) ABSTRACT

A permanent magnet rotor and a permanent magnet rotary assembly are provided. The permanent magnet rotor includes a rotor core, a plurality of permanent magnets and a non-magnetic retaining ring. The rotor core is magnetically permeable. The rotor core has an outer surface and a plurality of dovetail grooves on the outer surface. The permanent magnets are respectively disposed in the plurality of dovetail grooves. The non-magnetic retaining ring is inserted over the rotor core. The plurality of permanent magnets are surrounded by the non-magnetic retaining ring. The non-magnetic retaining ring is magnetically impermeable.

11 Claims, 7 Drawing Sheets

(56) References Cited

U.S. PATENT DOCUMENTS

| | | | | |
|---|---|---|---|---|
| 5,787,712 | A * | 8/1998 | Fukui | F25B 9/14 60/520 |
| 2008/0197736 | A1 * | 8/2008 | Himmelmann | H02K 1/2786 310/156.08 |
| 2008/0201935 | A1 * | 8/2008 | Nakayama | H02K 15/045 29/596 |
| 2009/0295245 | A1 * | 12/2009 | Abe | H02K 1/2793 310/156.35 |
| 2011/0285237 | A1 * | 11/2011 | Amari | H02K 1/2793 310/156.07 |
| 2012/0187794 | A1 * | 7/2012 | Inoue | H02K 1/2773 310/181 |
| 2013/0119808 | A1 * | 5/2013 | Hirokawa | H02K 1/2773 310/156.43 |
| 2016/0065011 | A1 * | 3/2016 | Schneider | H02K 1/2773 310/216.007 |
| 2016/0322873 | A1 * | 11/2016 | Udo | H02K 1/28 |

FOREIGN PATENT DOCUMENTS

| | | |
|---|---|---|
| TW | 483627 U | 4/2002 |
| TW | 579131 U | 3/2004 |
| TW | I285016 B | 8/2007 |
| TW | M491997 U | 12/2014 |
| TW | 201614935 A | 4/2016 |
| TW | 201630313 A | 8/2016 |

OTHER PUBLICATIONS

Influence on Rotor Eddy-Current Loss in High-Speed PM BLDC Motors in high-speed permanent magnet brushless DC motors retrieved Dec. 13, 2016.

Wang et al. Optimization Design of Rotor Structure for High Speed Permanent Magnet Machines (Oct. 11, 2007).

Wang et al. The research on mechanical properties of direct drive high-speed permanent-magnet machine for compression (Oct. 28, 2015).

* cited by examiner

PERMANENT MAGNET ROTOR AND PERMANENT MAGNET ROTARY ASSEMBLY

CROSS-REFERENCE TO RELATED APPLICATIONS

This non-provisional application claims priority under 35 U.S.C. § 119(a) on Patent Application No(s). 105135177 filed in Taiwan, R.O.C. on Oct. 28, 2016, the entire contents of which are hereby incorporated by reference.

TECHNICAL FIELD

The disclosure relates to a rotor, more particularly to a rotor having permanent magnets.

BACKGROUND

In the field of high speed permanent magnet motor, permanent magnets are easily thrown off from a rotor in a radial direction of a shaft by centrifugal force of the rotor while the rotor is rotated at a high speed. Therefore, developers are constantly working on solving the aforementioned problem.

In the conventional permanent magnet motor or alternating-current generator, there are two ways for fixing the magnets to the rotor. The first way is to attach the magnets to the surface of the rotor via adhesive. The second way is to dispose the magnets inside a rotor core of the rotor.

SUMMARY

The present disclosure provides a permanent magnet rotor and a permanent magnet rotary assembly.

One embodiment of the disclosure provides a permanent magnet rotor including a rotor core, a plurality of permanent magnets and a non-magnetic retaining ring. The rotor core is magnetically permeable. The rotor core has an outer surface and a plurality of dovetail grooves on the outer surface. The permanent magnets are respectively disposed in the plurality of dovetail grooves. The non-magnetic retaining ring is sleeved on the rotor core. The plurality of permanent magnets are surrounded by the non-magnetic retaining ring. The non-magnetic retaining ring is magnetically impermeable.

One embodiment of the disclosure provides a permanent magnet rotary assembly including a shaft, at least one permanent magnet rotor and a stator. The permanent magnet rotor is sleeved on the shaft. The permanent magnet rotor includes a rotor core, a plurality of permanent magnets and a non-magnetic retaining ring. The rotor core is magnetically permeable. The rotor core has an outer surface and a plurality of dovetail grooves on the outer surface. The permanent magnets are respectively disposed in the plurality of dovetail grooves. The non-magnetic retaining ring is sleeved on the rotor core. The plurality of permanent magnets are surrounded by the non-magnetic retaining ring. The non-magnetic retaining ring is magnetically impermeable. The rotor and the shaft are surrounded by the stator.

A detailed description is given in the following embodiments with reference to the accompanying drawings.

BRIEF DESCRIPTION OF THE DRAWINGS

The present invention will become better understood from the detailed description given hereinbelow and the accompanying drawings which are given by way of illustration only and thus are not limitative of the present invention and wherein.

DETAILED DESCRIPTION

Figure 1:
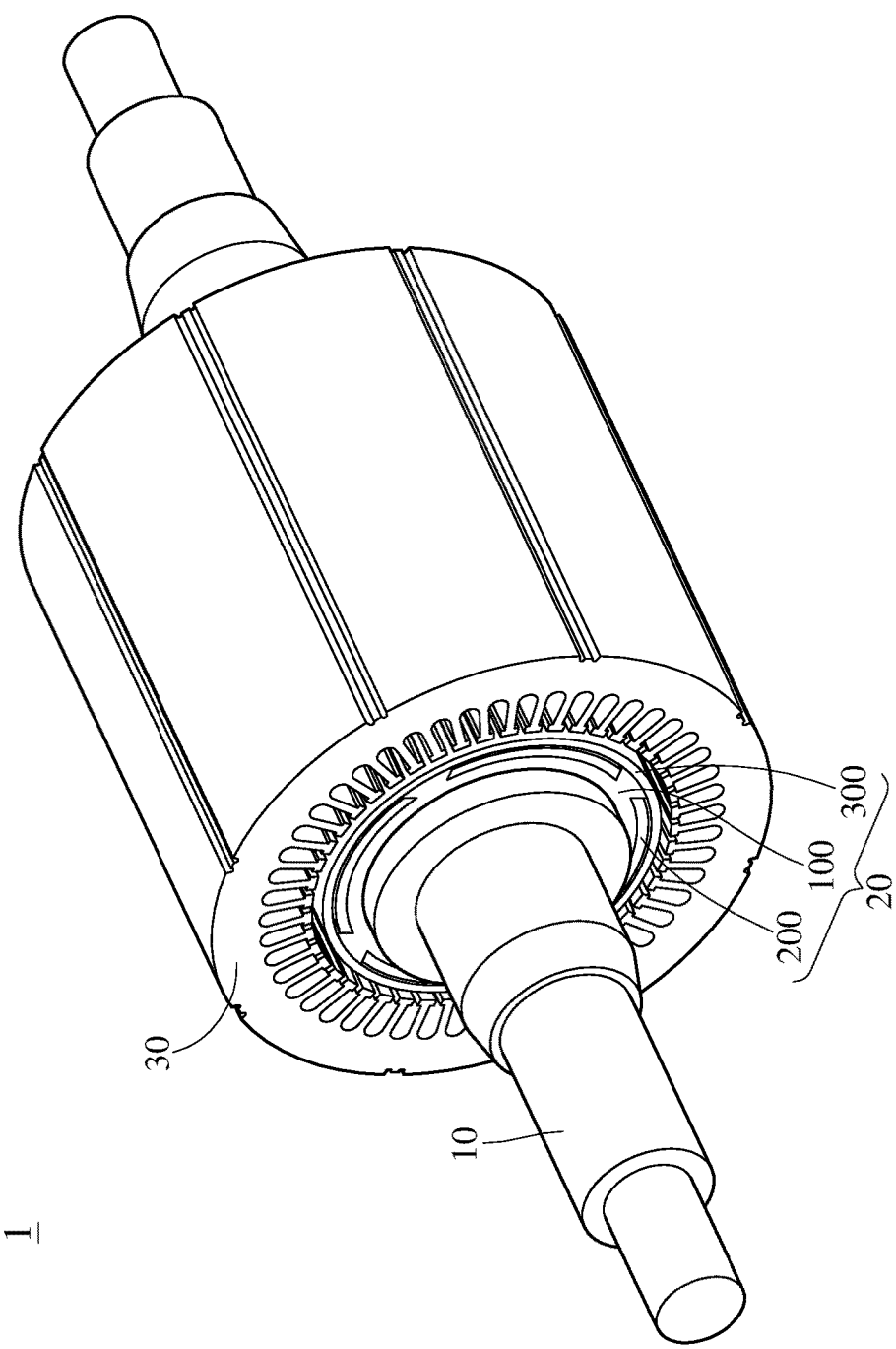
FIG. 1 is a perspective view of a permanent magnet rotary assembly according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
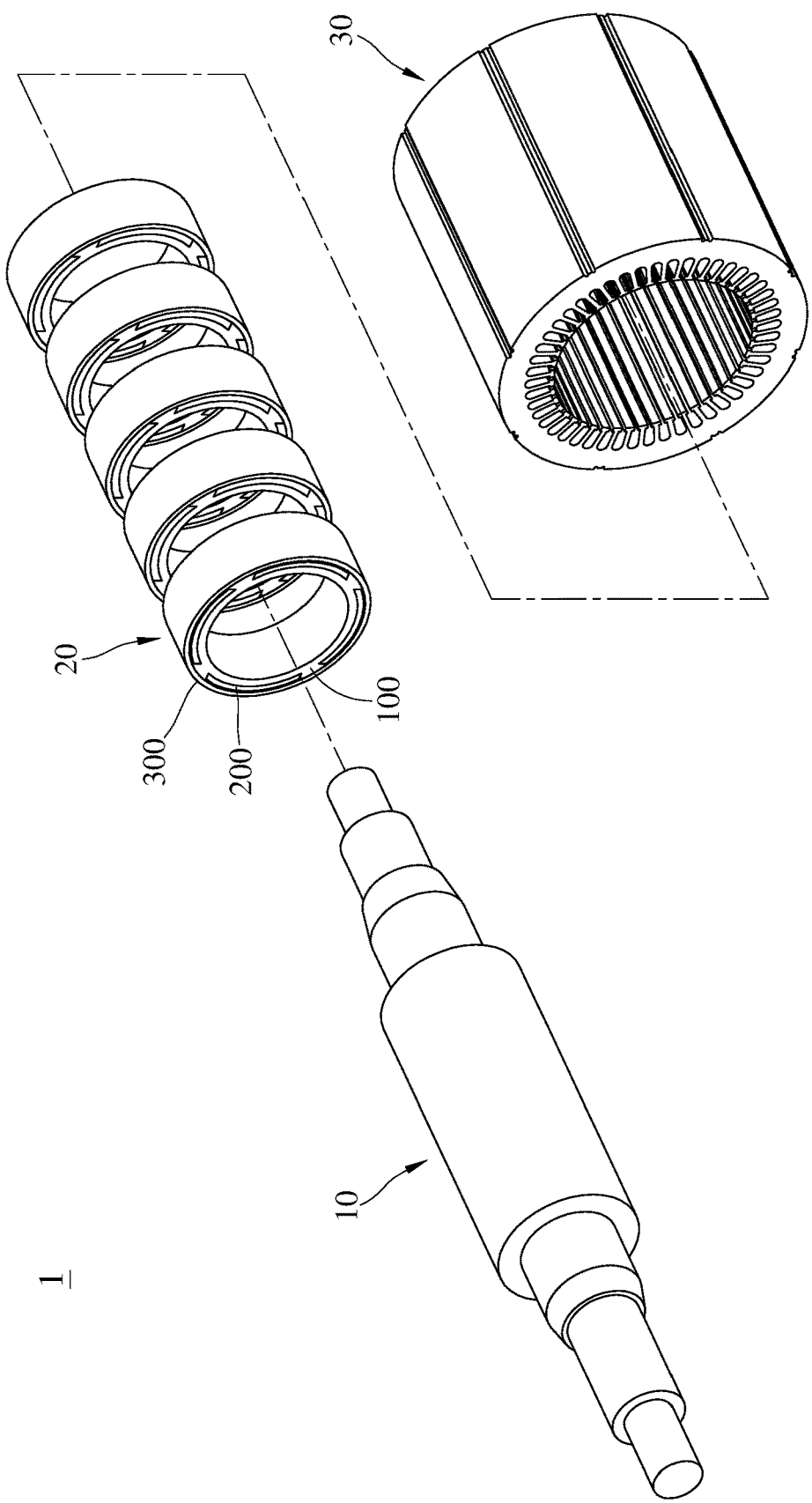
FIG. 2 is an exploded view of the permanent magnet rotary assembly in FIG. 1.
Figure 3:
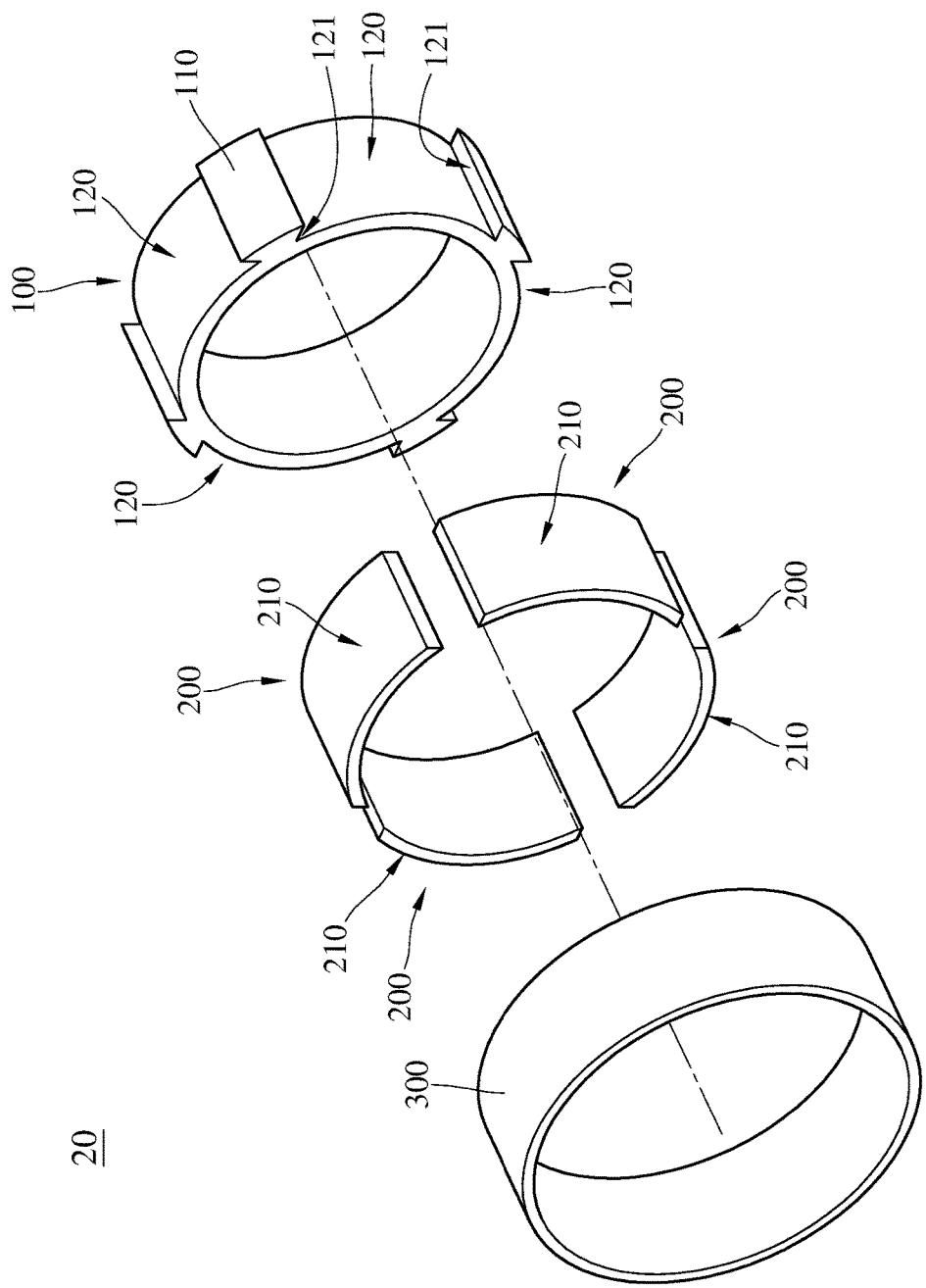
FIG. 3 is an exploded view of a permanent magnet rotor in FIG. 2.
Figure 4:
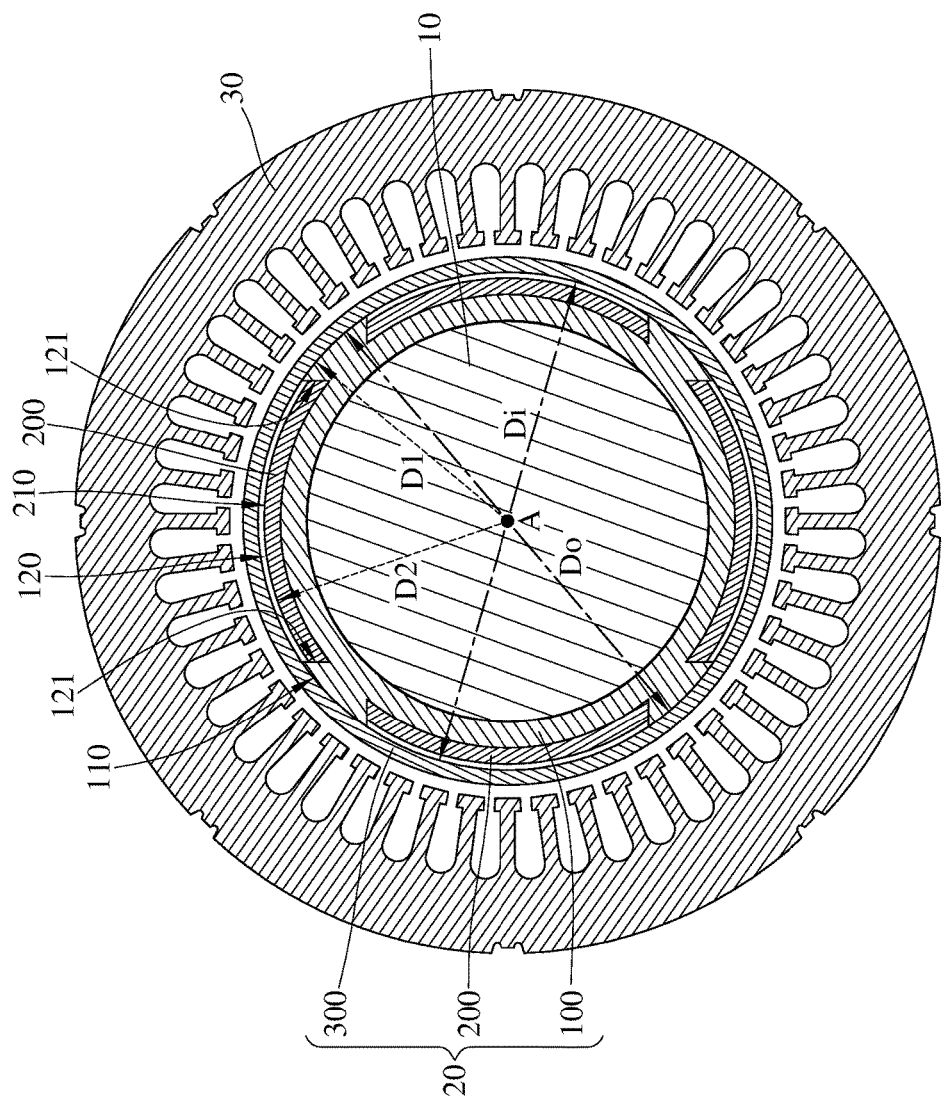
FIG. 4 is a cross-sectional view of the permanent magnet rotary assembly in FIG. 1.

Please refer to FIG. 1 to FIG. 4. FIG. 1 is a perspective view of a permanent magnet rotary assembly according to an embodiment of the disclosure, FIG. 2 is an exploded view of the permanent magnet rotary assembly in FIG. 1, FIG. 3 is an exploded view of a permanent magnet rotor in FIG. 2, and FIG. 4 is a cross-sectional view of the permanent magnet rotary assembly in FIG. 1.

In this embodiment, a permanent magnet rotary assembly 1 is provided. The permanent magnet rotary assembly 1 includes a shaft 10, a plurality of permanent magnet rotors 20 and a stator 30. The permanent magnet rotor 20 is able to be accelerated to a high rotational speed. In this embodiment, the said high rotational speed of the permanent magnet rotor 20 is, for example, about 30000 rotations per minute or higher. The permanent magnet rotor 20 is connected to the shaft 10. The permanent magnet rotor 20 and the shaft 10 are able to be rotated jointly. The stator 30 is, for example, fixed to a case (not shown). The permanent magnet rotor 20 and the shaft 10 are surrounded by the stator 30. The present disclosure is not limited to the number of the permanent magnet rotors 20. In some embodiments, the permanent magnet rotary assembly may have only one permanent magnet rotor 20.

Each of the permanent magnet rotors 20 includes a rotor core 100, a plurality of permanent magnets 200 and a non-magnetic retaining ring 300.

The rotor core 100 is made of magnetically permeable material such as iron, cobalt, nickel and other alloys. The rotor core 100 has a central axis A, an outer surface 110 and a plurality of dovetail grooves 120 formed on the outer surface 110. Each dovetail groove 120 has two groove side surfaces 121 which are opposite to each other. In each dovetail groove 120, a distance between the ends of the two groove side surfaces 121 furthest away from the central axis A is less than a distance between the ends of the two groove side surfaces 121 closest to the central axis A.

The permanent magnets 200 are respectively tightly fitted into the dovetail grooves 120. The permanent magnet 200 is pressed by the two groove side surfaces 121 so as to force the permanent magnet 200 to firmly fix to the rotor core 100. Therefore, when the permanent magnet rotor 20 is rotated at a high speed, the movement of the permanent magnets 200 are restricted by the groove side surfaces of the dovetail grooves 121 so that the permanent magnets 200 are prevented from moving in a radial direction of the rotor core 100, that is, the permanent magnet 200 is prevented from being thrown off the rotor core 100.

Accordingly, the permanent magnets 200 are prevented from hitting the stator 30 to cause damage to the motor.

In this embodiment, both of the number of the permanent magnets 200 and the number of the dovetail grooves 120 are four, but the present disclosure is not limited thereto. In some embodiments, both of the number of the permanent magnets 200 and the number of the dovetail grooves 120 may be three or over five. In addition, the larger the numbers of the permanent magnets 200 and the dovetail grooves 120 have higher degree of reliability when the permanent magnet 200 is assembled into the dovetail groove 120.

In most cases, the dovetail groove 120 is able to prevent the permanent magnet 200 from moving in the radial direction of the rotor core 100, but the dovetail groove 120 cannot completely prevent the permanent magnet 200 from being thrown off from the rotor core 100. In detail, when the permanent magnet rotor 20 is rotated at a high speed, two opposite sides of the permanent magnet 200 may be deformed or broken because the centrifugal force applied on the permanent magnet 200 is overly strong; or, the rotor core 100 may be deformed by the effect of the centrifugal force applied thereon. As a result, the permanent magnet 200 may be thrown off from the dovetail groove 120 when the permanent magnet rotor 20 is rotated at a high speed.

In this embodiment, the non-magnetic retaining ring 300 tightly disposed on the rotor core 100 is taken as a secondary protection in order to further prevent the permanent magnet 200 from being thrown off from the rotor core 100. In detail, the non-magnetic retaining ring 300 is made of magnetically impermeable material such as titanium alloys. The non-magnetic retaining ring 300 is sleeved on the rotor core 100, and the permanent magnets 200 are surrounded by the non-magnetic retaining ring 300.

In addition, as shown in FIG. 4, the non-magnetic retaining ring 300 has an inner diameter Di, the rotor core 100 has an outer diameter Do, and the inner diameter Di is less than the outer diameter Do, so that the non-magnetic retaining ring 300 is able to be tightly sleeved on the rotor core 100 to form an interference fit between the rotor core 100 and the non-magnetic retaining ring 300. In this embodiment, the inner diameter Di is, for example, 0.35 millimeters less than the outer diameter Do, but the present disclosure is not limited thereto. In some embodiments, the difference between the inner diameter Di and the outer diameter Do is between 0.25 millimeters and 0.45 millimeters. The non-magnetic retaining ring 300 is able to be sleeved on the rotor core 100 via a jig (not shown).

Furthermore, the non-magnetic retaining ring 300 is able to retain the permanent magnets 200 in the dovetail grooves 120. That is, the non-magnetic retaining ring 300 is able to prevent the permanent magnets 200 from being thrown off from the dovetail grooves 120.

Moreover, each permanent magnet 200 has an outer side surface 210 opposite to the central axis A. A distance D1 from the central axis A to the outer surface 110 of the rotor core 100 is greater than a distance D2 from the central axis A to the outer side surface 210 of the permanent magnet 200 so that it is favorable for reducing the contact area between the non-magnetic retaining ring 300 and the rotor core 100. In such a case, the non-magnetic retaining ring 300 is able to be sleeved on the rotor core 100 more easily. In detail, a difference between the distance D1 and the distance D2 is between, for example, 0.1 millimeters and 0.2 millimeters.

In this embodiment, the non-magnetic retaining ring 300 is magnetically impermeable, so the amount of magnetic lines of force simultaneously passing through the permanent magnet 200 and stator wires is not decreased when the thickness of the non-magnetic retaining ring 300 is increased. Therefore, the non-magnetic retaining ring 300 is able to be designed thicker according to the requirement of structural strength, so the permanent magnets 200 are retained in the dovetail grooves 120 and prevented from being thrown off from the dovetail grooves 120 to hit the motor, while the permanent magnet rotor 20 is rotated at a high speed.

Figure 5:
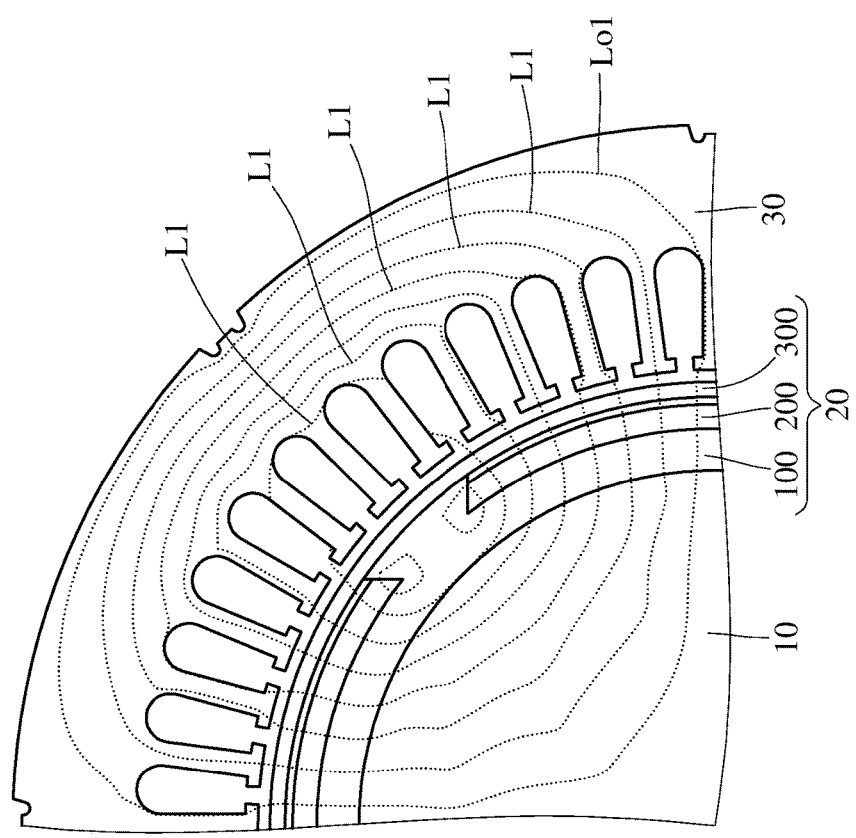
FIG. 5 is a view showing magnetic line of force of the permanent magnet rotor in FIG. 1.
Figure 6:
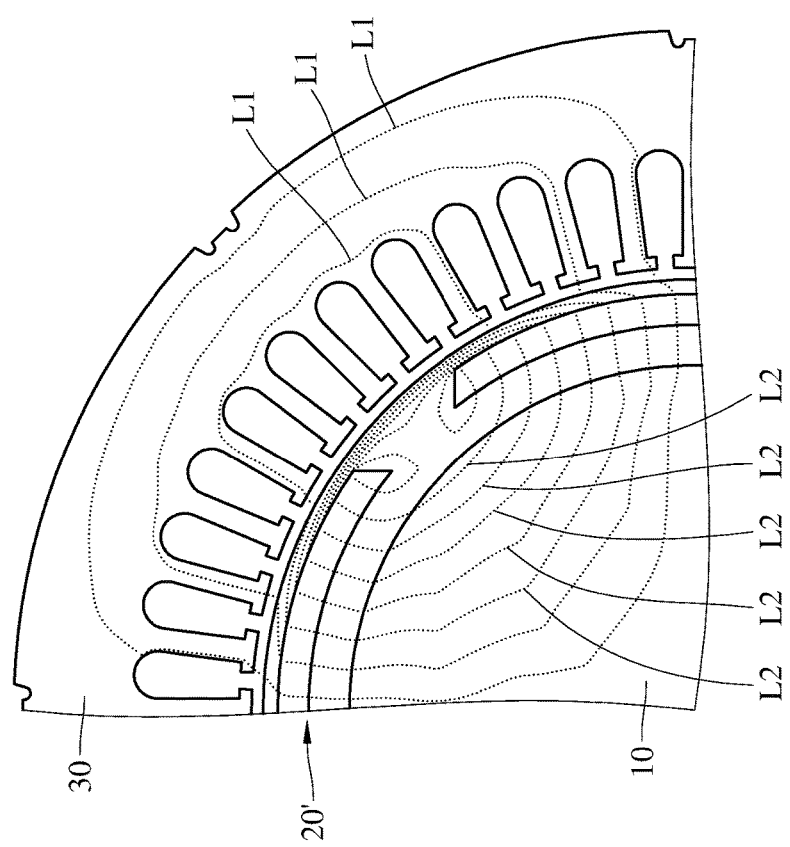
FIG. 6 is a view showing magnetic line of force of a permanent magnet rotor having a rotor core with permanent magnets therewithin.

Please refer to FIG. 5 and FIG. 6, FIG. 5 is a view showing magnetic line of force of the permanent magnet rotor in FIG. 1, and FIG. 6 is a view showing magnetic line of force of a permanent magnet rotor having a rotor core with permanent magnets therewithin.

As shown in FIG. 5, since the non-magnetic retaining ring 300 is magnetically impermeable, the magnetic line of force from the permanent magnet 200 is able to pass through the stator 30 and then back to the permanent magnet 200, for forming a plurality of magnetic lines of force L1 simultaneously passing through the permanent magnet 200 and the stator wires.

In comparison, as shown in FIG. 6, the permanent magnet rotor 20 is replaced with a conventional permanent magnet rotor 20', and the conventional permanent magnet rotor 20' has permanent magnets disposed inside its rotor core. In such a case, part of the rotor core is located between the permanent magnets and the stator. The magnetic lines of force L2 are formed, but the magnetic lines of force L2 do not pass through the stator wires since the rotor core is magnetically permeable. Hence, the amount of the magnetic line of force L1 is largely decreased.

Figure 7:
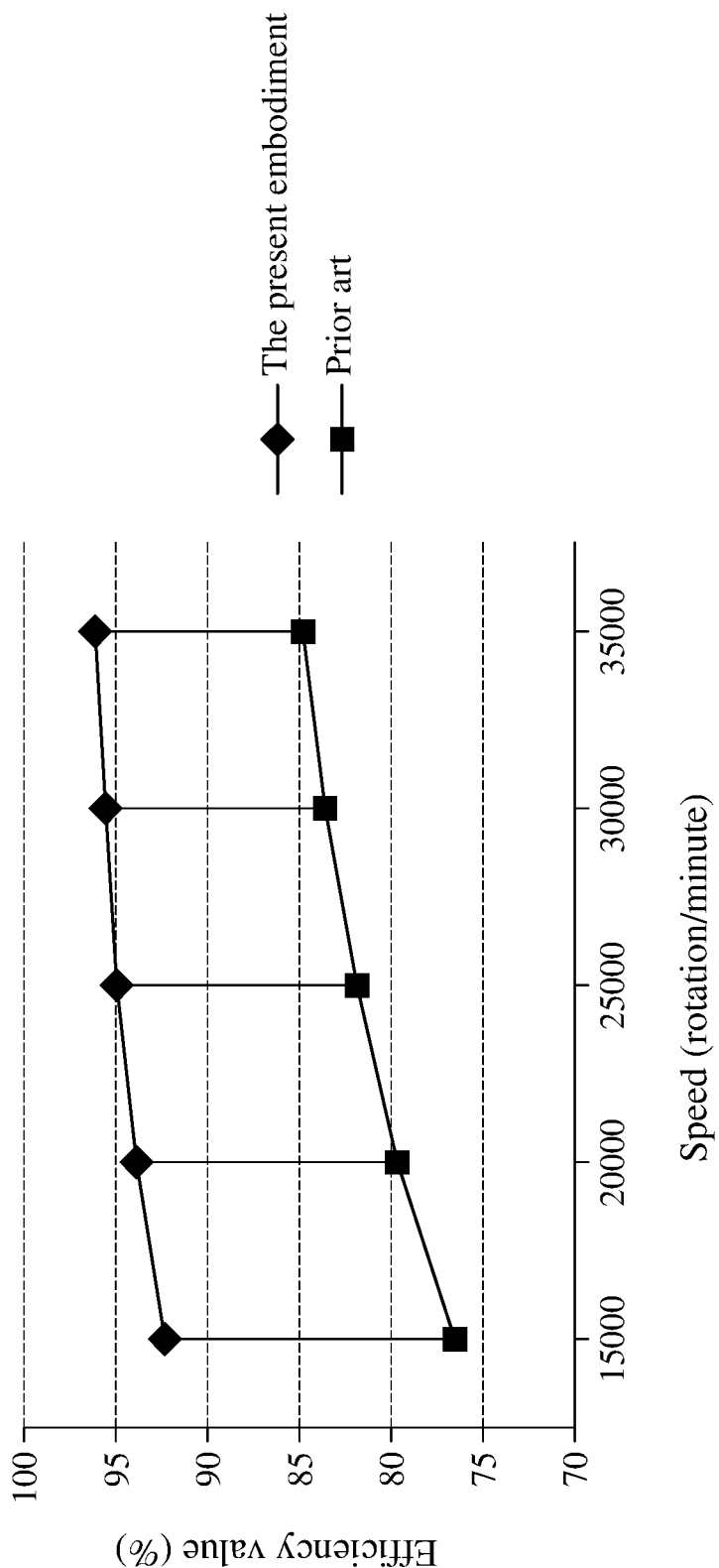
FIG. 7 is a comparison chart of the permanent magnet rotor in FIG. 1 and a conventional rotor.

Please refer to FIG. 7, FIG. 7 is a comparison chart of the rotor in FIG. 1 and a conventional rotor.

As shown in FIG. 7, an efficiency value of the motor using the permanent magnet rotor 20 of the present disclosure is about 93% to 96%. However, the efficiency value of the conventional motor using the rotor core with the permanent magnets therewithin is about 77% to 84%. It is obvious that the permanent magnet rotor 20 of the present disclosure is able to highly enhance the efficiency value of motor.

According to the permanent magnet rotor and the permanent magnet rotary assembly as discussed above, the permanent magnets have two protections, one is the dovetail grooves of the rotor core, and the other is the non-magnetic retaining ring, so the permanent magnets are able to be fixed on the rotor core and prevented from hitting the stator while the permanent magnet rotor is rotated at a high speed.

In addition, the non-magnetic retaining ring is magnetically impermeable, so the amount of magnetic lines of force passing through the permanent magnet and stator wires is not decreased when the non-magnetic retaining ring to be thicker, which is favorable for the assembly efficiency and assembly reliability simultaneously.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A permanent magnet rotor, comprising:
 a rotor core having an outer surface and a plurality of dovetail grooves formed on the outer surface of the rotor core, wherein the rotor core is magnetically permeable;
 a plurality of permanent magnets respectively disposed in the plurality of dovetail grooves; and
 a non-magnetic retaining ring, wherein the non-magnetic retaining ring surrounds the rotor core and the plurality of permanent magnets and is magnetically impermeable.

2. The permanent magnet rotor according to claim 1, wherein the non-magnetic retaining ring has an inner diameter, the rotor core has an outer diameter, and the inner diameter of the non-magnetic retaining ring is less than the outer diameter of the rotor core.

3. The permanent magnet rotor according to claim 2, wherein a difference between the inner diameter of the non-magnetic retaining ring and the outer diameter of the rotor core is between 0.25 millimeters and 0.45 millimeters.

4. The permanent magnet rotor according to claim 1, wherein the rotor core has a central axis, each of the plurality of permanent magnets has an outer side surface opposite to the central axis of the rotor core, and a distance from the central axis to an outer surface of the rotor core is greater than a distance from the central axis to the outer side surface of one of the plurality of permanent magnets.

5. The permanent magnet rotor according to claim 4, wherein a difference between the distance from the central axis to the outer surface of the rotor core and the distance from the central axis to the outer side surface of each of the plurality of permanent magnets is between 0.1 millimeters and 0.2 millimeters.

6. The permanent magnet rotor according to claim 1, wherein the plurality of permanent magnets are respectively tightly fitted into the plurality of dovetail grooves.

7. The permanent magnet rotor according to claim 1, wherein the rotor core has an central axis, each of the plurality of dovetail grooves has two groove side surfaces opposite to each other, in each of the plurality of dovetail grooves, a distance between ends of the two groove side surfaces furthest away from the central axis is less than a distance between ends of the two groove side surfaces closest to the central axis.

8. The permanent magnet rotor according to claim 1, wherein the non-magnetic retaining ring is made of titanium alloys.

9. The permanent magnet rotor according to claim 1, wherein a number of the plurality of permanent magnets is at least three.

10. A permanent magnet rotary assembly, comprising:
 a shaft;
 at least one permanent magnet rotor being inserted over the shaft, the at least one permanent magnet rotor comprising:
  a rotor core having an outer surface and a plurality of dovetail grooves on the outer surface, wherein the rotor core is magnetically permeable;
  a plurality of permanent magnets respectively disposed in the plurality of dovetail grooves; and
  a non-magnetic retaining ring, wherein the non-magnetic retaining ring surrounds the rotor core and the plurality of permanent magnets and is magnetically impermeable; and
 a stator, the rotor and the shaft surrounded by the stator.

11. The permanent magnet rotary assembly according to claim 10, wherein a number of the at least one permanent magnet rotor is multiple, and the permanent magnet rotors and the shaft are surrounded by the stator.

* * * * *